United States Patent [19]

Matsuoka

[11] Patent Number: 5,081,970
[45] Date of Patent: Jan. 21, 1992

[54] HEAT-INSULATING ENGINE WITH SWIRL CHAMBER

[75] Inventor: Hiroshi Matsuoka, Yamato, Japan

[73] Assignee: Isuzu Motors Limited, Tokyo, Japan

[21] Appl. No.: 591,168

[22] Filed: Oct. 1, 1990

[30] Foreign Application Priority Data

Sep. 29, 1989 [JP] Japan .................................. 1-252272

[51] Int. Cl.$^5$ ...................... F02M 45/06; F02B 19/14
[52] U.S. Cl. .................................... 123/275; 123/300; 123/508
[58] Field of Search ............... 123/508, 254, 255, 275, 123/299, 300, 270, 271

[56] References Cited

U.S. PATENT DOCUMENTS

| | | | |
|---|---|---|---|
| 2,594,681 | 4/1952 | Ricardo et al. | 123/300 |
| 2,858,814 | 11/1958 | Meurer | 123/255 |
| 4,217,871 | 8/1980 | Ohashi et al. | 123/299 |
| 4,733,641 | 3/1988 | Ishida | 123/299 |

FOREIGN PATENT DOCUMENTS

| | | |
|---|---|---|
| 0352058 | 1/1990 | European Pat. Off. |
| 2922683 | 12/1980 | Fed. Rep. of Germany |
| 3442628 | 5/1986 | Fed. Rep. of Germany |

OTHER PUBLICATIONS

"Patent Abstracts of Japan", vol. 10, No. 44, *Diesel Engine*, Isuzu Jidosha K.K.; Feb. 21, 1986.
"Patent Abstracts of Japan", vol. 6, No. 109, *Internal Combustion Engine*, Nippon Jidoushiya Kenkyusho, Jun. 19, 1982.

*Primary Examiner*—Tony M. Argenbright
*Attorney, Agent, or Firm*—Browdy and Neimark

[57] ABSTRACT

The heat-insulating engine with swirl chamber of this invention injects fuel at a low pressure along the inner wall surface of swirl chambers having a heat-insulating structure by subsidiary nozzles opened and closed electrically, from the second half of an intake stroke to a compression stroke, and then injects mainly the fuel by main nozzles into the swirl chambers from the second half of the compression stroke to an expansion stroke. Atomization of the fuel from the subsidiary nozzles may be to such an extent that the fuel merely attaches to the wall surface; hence, the subsidiary nozzles can be of an accumulation type low pressure injection type. The fuel from the subsidiary nozzles is injected to the wall surface of the swirl chambers in the contact state so as to deprive the wall surface of the heat and thus to recover the heat. Main injection is effected following the sibsidiary injection and a rich mixture is generated inside the swirl chambers so as to restrict the generation of NOx and to improve cycle efficiency. It is possible to prevent a lean mixture from diffusing into cylinders. Since the fuel of subsidiary injection is caused to stay inside the swirl chambers, degradation of hydrocarbon components can be reduced.

13 Claims, 2 Drawing Sheets

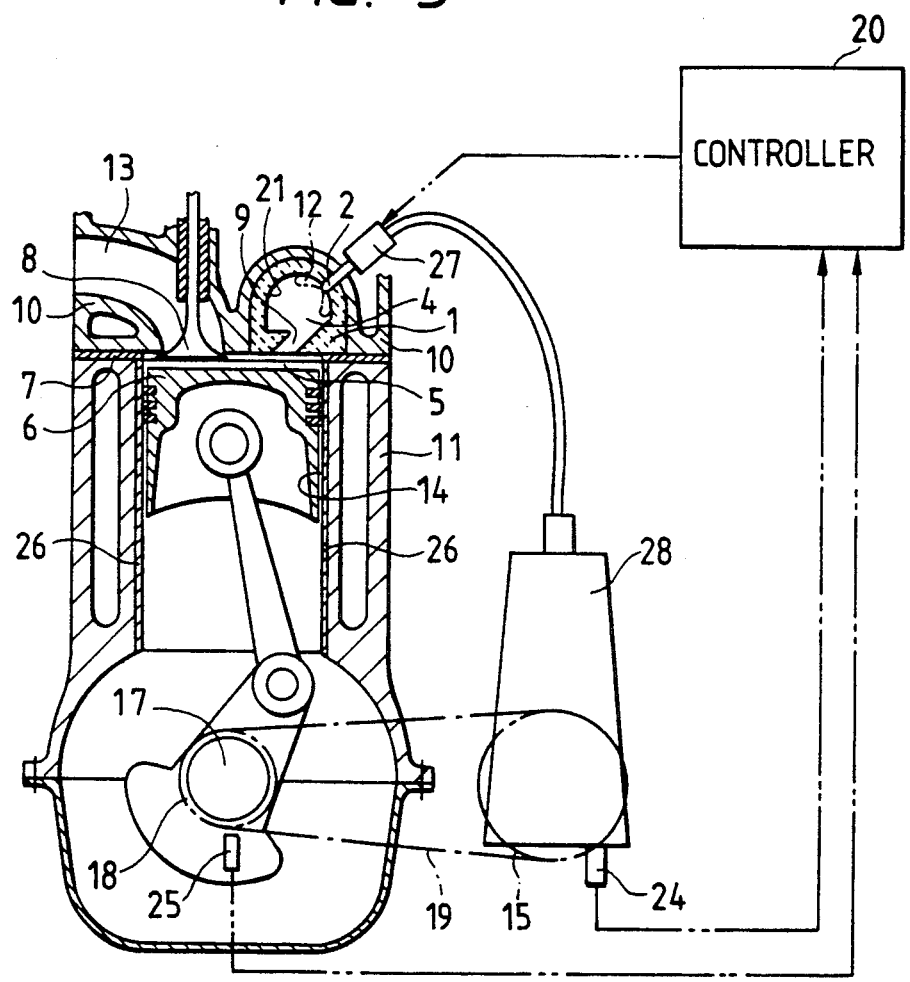

HEAT-INSULATING ENGINE WITH SWIRL CHAMBER

BACKGROUND OF THE INVENTION

1. Field of the Invention

This invention relates to a heat-insulating engine with swirl chamber equipped with nozzles for effecting main injection and subsidiary injection into swirl chambers.

2. Description of the Prior Art

It is known conventionally that when a pre-mixture is sucked to a certain extent and the sucked pre-mixture is compressed and then injected from nozzles in a Diesel engine, the engine output can be improved and the occurrence of smoke and the like can be reduced. In this case, since the pre-mixture has an extremely lean mixture ratio and is distributed substantially uniformly throughout the cylinders, the pre-mixture existing near the cylinder walls and in the gap between the top land of a piston head an cylinder liners is not burnt even after the fuel is injected from ordinary nozzles and is exhausted as an unburnt gas and thus results in deterioration of hydrocarbon components of the fuel.

The structure of a heat-insulating engine utilizing a ceramic material as a heat-insulating material or as a heat-resistant material is conventionally disclosed, for example, in Japanese Patent Application No. 180250/1988 (Japanese Patent Laid-Open No. 33454/1000). The structure of the heat-insulating piston described in this prior art reference is such that a main combustion chamber made of a high density ceramic thin sheet and fitted to a cylinder head through a heat-insulating material communicates with swirl chambers whose swirl chamber blocks are made of a material having low heat conductivity and have their inner wall surfaces composed of a high density ceramic thin sheet and which are provided with fuel injection nozzles. In the structure of this heat-insulating engine, the main combustion chamber has a unitary structure of a head lower surface thin sheet made of a high density ceramic and opposing the lower surface of the cylinder head and a liner thin sheet, the liner thin sheet is fitted to the upper portion of a cylinder liner made of a material having low heat conductivity, inlet/outlet passage of the swirl chambers communicate with the openings formed on the head lower surface thin sheet and the portion of the piston head on the main combustion side is composed of the head thin sheet made of a high density ceramic.

In the structure of the heat-insulating engine disclosed in Japanese Patent Application No. 180250/1988 described above, the thermal capacity of the ceramic members constituting the wall surfaces of the main combustion chamber and swirl chambers is reduced as much as possible to improve suction efficiency of the engine, mixing between atomized fuel and air is promoted rapidly by the improvement in suction efficiency and the fuel equivalent ratio is reduced drastically in order to reduce the combustion time in a smoke generation temperature zone and to avoid the combustion in a NOx generation temperature zone. Moreover, the structure can prevent the decrease of strength resulting from the reduction of thickness of the ceramic material.

In the heat-insulating engine such as the one described above, there remains the problem as to how the heat-insulating engine with swirl chamber be constituted in order to further recover the heat energy from the inner wall of the swirl chambers, to prevent the lean mixture from diffusing into the cylinders and thus to eliminate deterioration of the hydrocarbons of the fuel.

SUMMARY OF THE INVENTION

It is a main object of the present invention to solve the problems described above and to provide a heat-insulating engine with swirl chamber having the structure wherein the wall surface of swirl chambers is made of a ceramic material in a heat-insulating structure, two nozzles of a main nozzle and a subsidiary nozzle or one nozzle is disposed in each swirl chamber, the fuel is injected subsidiarily into the swirl chambers so as to improve the output and the fuel economy, to reduce the occurrence of smoke and ignition delay and hence, the occurrence of noise, atomization of the fuel from the subsidiary nozzles may be to such an extent that it touches the wall surface, the subsidiary nozzles are accumulation type low pressure injection nozzles, a fuel pressurization pump itself for supplying the fuel to the subsidiary nozzles is compact in size and light in weight and the production cost can thus be reduced.

It is another object of the present invention to provide a heat-insulating engine with swirl chamber having the structure wherein subsidiary injection from subsidiary nozzles is made by accumulation type low pressure injection, the fuel is injected along the inner wall surfaces of swirl chambers which attain a high temperature, in such a manner as to spread over the inner wall surfaces, the fuel injection quantity and the fuel injection timing are controlled in response to the operating conditions of an engine so that the fuel injected subsidiarily deprives the inner wall surfaces of the swirl chambers of the heat and evaporates on heating so as to recover the heat energy, main injection is effected following the subsidiary injection so as to bring the mixture into a rich state and to restrict the occurrence of NOx, cycle efficiency can be improved, the fuel of the subsidiary injection is caused to stay inside swirl chambers and is prevented from being injected into the cylinders and degradation of hydrocarbon components which occurs otherwise due to stagnation of the lean mixture in cylinders can be limited.

In a heat-insulating engine with swirl chamber which includes a cylinder block having cylinders, a cylinder head fitted to the cylinder block, pistons reciprocating inside the cylinders, swirl chamber blocks of a heat-insulating structure disposed in the cylinder head and swirl chambers formed in the swirl chamber blocks and which is operated sequentially in four-cycle of an intake stroke, a compression stroke, an expansion stroke and an exhaust stroke, it is still another object of the present invention to provide a heat-insulating engine with swirl chamber which comprises subsidiary nozzles each having an accumulation chamber for accumulating temporarily the fuel from a fuel pressurization pump and injecting at a low pressure the fuel along the inner wall surfaces of the swirl chambers from the second half of the intake stroke to the compression stroke, and main nozzles for injecting mainly the fuel from a fuel injection pump into the swirl chambers from the second half of the compression stroke to the expansion stroke following the fuel injection by the subsidiary nozzles.

It is still another object of the present invention to provide a heat-insulating engine with swirl chamber which comprises subsidiary nozzles having their injection ports opened to swirl chambers, each having a needle valve opened and closed electrically, and injecting the fuel along the inner wall surfaces of the swirl chamber blocks from the second half of the intake stroke to the compression stroke by the opening and closing operation of the needle valves; a fuel pressurization pump for supplying a low pressure fuel to the subsidiary nozzles; main nozzles having their injection ports opened to the swirl chambers and injecting mainly the fuel into the swirl chambers from the second half of the compression stroke to the first half of the expansion stroke following the fuel injection by the subsidiary nozzles; a fuel injection pump for supplying the fuel to the main nozzles; and rotary motion transmission means for transmitting the rotary motion of a crank shaft for operating the fuel injection pump and the fuel pressurization pump, the transmission means comprising a crank pulley fitted to the crank shaft, a pump operation pulley for operating the fuel injection pump, a pump operation pulley for operating the fuel pressurization pump and a timing belt for transmitting the rotary motion of the crank pulley to each pump operation pulley.

It is still another object of the present invention to provide a heat-insulating engine with swirl chamber which includes swirl chambers having a heat-insulating structure, main nozzles for injecting mainly the fuel to the swirl chambers from the second half of a compression stroke to an expansion stroke, subsidiary nozzles for injecting the fuel along the inner wall surfaces of the swirl chambers when needle valves opened and closed electrically are open, sensors for detecting the operation conditions of the engine, and a controller for controlling the flow rate of the fuel injected from the subsidiary nozzles in response to the detection signals of the sensors and controls the subsidiary injection of the fuel from the second half of an intake stroke to a compression stroke; and which can control optimally the flow rate of the fuel of subsidiary injection in accordance with the operating conditions of the engine such as an engine load and engine revolution, can accurately and reliably recover heat energy and can eliminate deterioration of hydrocarbons.

It is still another object of the present invention to provide a heat-insulating engine with swirl chamber which includes swirl chambers having a heat-insulating structure, nozzles each having a needle valve and injecting a fuel to the swirl chambers when the needle valve, which is opened and closed electrically, is opened, a fuel pressurization pump for supplying the fuel to the nozzles, sensors for detecting the operating conditions of an engine and a controller for controlling the flow rate of the fuel injected from the nozzles in response to the detection signals of the sensor and controlling subsidiary injection of the fuel from the second half of an intake stroke to a compression stroke and then main injection of the fuel from the second half of the compression stroke to an expansion stroke; which exhibits the same function as the heat-insulating engine described above; whose fuel pressurization pump needs only one accumulation type fuel injection nozzle; and which can be constituted in a remarkably compact size and remarkably light weight and can reduce the cost of production.

It is still another object of the present invention to provide a heat-insulating engine with swirl chamber which can effect subsidiary injection of the fuel from the subsidiary nozzles described above while bringing it into contact with the wall surface of the swirl chambers at the time of a high speed and high load operation of the engine at which the inside of the swirl chambers attains a high temperature and can deprive sufficiently the inner wall surface of the swirl chambers of the heat by this subsidiary injection, whereby the fuel receives the heat, evaporates, recovers sufficiently the heat energy from the inner wall surface and cools it; can form a sufficiently satisfactory lean mixture because there is a relatively long period from the subsidiary injection of the fuel from the subsidiary nozzles to the main injection by the main nozzles or in other words, from the subsidiary injection to the upper dead point at which the explosion stroke or expansion stroke is started; which can moreover prevent the lean mixture from diffusing into the cylinders because the subsidiary injection only to the swirl chambers is made during the compression stroke in which air flows into the swirl chamber and the full quantity of the fuel of the subsidiary injection stays inside the swirl chambers; and which can thus prevent the mixture from staying inside the cylinders and can eliminate deterioration of hydrocarbons.

It is still another object of the present invention to provide a heat-insulating engine with swirl chamber which can convert the fuel to the fuel-rich mixture by the main injection because the lean mixture has already been formed by the subsidiary injection at the time of main injection and combustion by the Cain nozzles, can restrict the formation of NOx, can shorten the main combustion time because the lean mixture exists in advance, can improve cycle efficiency, can use a low pressure type pump as the fuel pressurization pump described above because the subsidiary nozzles are constituted as the accumulation type fuel injection nozzles, can reduce the size and weight of the fuel pressurization pump itself, and can reduce the cost of production.

It is a further object of the present invention to provide a heat-insulating engine with swirl chamber which comprises a fuel pressurization pump for supplying a fuel to nozzles; sensors for detecting the operating conditions of an engine; a controller for controlling the flow rate of the fuel injected from the nozzles in response to the detection signals of the sensors and controlling the subsidiary injection of the fuel along the inner wall surface of the swirl chambers by the opening and closing operations of the needle valves of the nozzles from the second half of the intake stroke to the compression stroke and then the main injection of the fuel from the second half of the compression stroke to the expansion stroke; and rotary motion transmission means for transmitting the rotary motion of the crank shaft described above in order to operate the fuel pressurization pump, the rotary motion transmission means comprising a crank pulley fitted to the crank shaft described above, a pump operation pulley for operating the fuel pressurization pump described above, and a timing belt for transmitting the rotary motion of the crank pulley to the pump operation pulley.

BRIEF DESCRIPTION OF THE DRAWINGS

FIG. 3 is an explanatory view showing an another embodiment of the heat-insulating engine with swirl chamber in accordance with the present invention which will be useful for explaining a fuel injection control apparatus of the heat-insulating engine with swirl chamber.

DESCRIPTION OF THE PREFERRED EMBODIMENTS

Hereinafter, preferred embodiments of the heat-insulating engine with swirl chamber in accordance with the present invention will be explained in detail with reference to the accompanying drawings.

Figure 1:
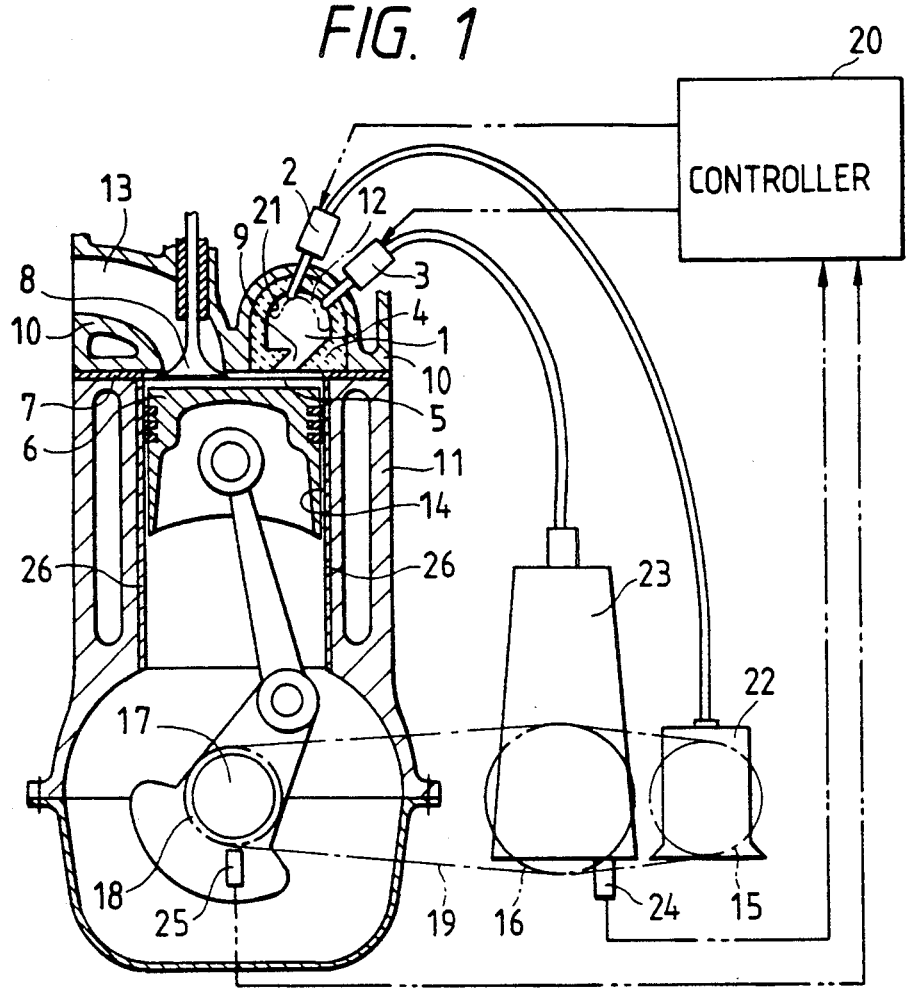
FIG. 1 is an explanatory view showing an embodiment of a heat-insulating engine with swirl chamber in accordance with the present invention.

FIG. 1 is a schematic sectional view of the heat-insulating engine with swirl chamber in accordance with the present invention. This heat-insulating engine with swirl chamber is a swirl chamber type Diesel engine equipped with swirl chambers 4. Each swirl chamber 4 is constituted in a heat-insulating structure by use of a ceramic material and is equipped with a subsidiary nozzle 2. The heat-insulating engine with swirl chamber includes primarily a cylinder block 11 equipped with cylinders 14, cylinder liners 26 fitted to the cylinders 14, a cylinder head 10 fixed to the cylinder block 11 through a gasket 7, pistons 6 reciprocating inside the cylinder liners 26, intake/exhaust ports 13 and swirl chambers 4 of a heat-insulating structure that are formed in the cylinder head 10, intake/exhaust valves 8 disposed at the intake/exhaust ports 13, main and subsidiary nozzles 3 and 2 disposed in the swirl chambers 4, and a main combustion chamber 5 which is defined by the lower surface portions of the cylinder liners 26 and cylinder head 10 and the piston head portion and communicates with the swirl chambers 4 through communication ports 9.

In this heat-insulating engine with swirl chamber, each swirl chamber 4 comprises a swirl chamber block 1 which is made of a ceramic material such as silicon nitride ($Si_3N_4$), silicon carbide (SiC), aluminum titanate, potassium titanate and composite materials, in the heat-insulating structure.

The heat-insulating engine with swirl chamber is equipped with a fuel injection pump 23 for supplying a fuel to the main nozzle 3 disposed in each swirl chamber 4 and a fuel pressurization pump 22 for supplying the fuel to the subsidiary nozzle 2 disposed in the swirl chamber 4. A small quantity of the fuel among the total fuel injection quantity is injected subsidiarily from the subsidiary nozzle 2, to which the fuel is supplied from the fuel pressurization pump 22, into the swirl chamber 4. Then, the major proportion of the fuel among the total fuel injection quantity is injected mainly from the main nozzle 3 to which the fuel is supplied from the fuel injection pump 23, into the swirl chamber 4.

In this heat-insulating engine with swirl chamber, the subsidiary nozzles 2 can be of an accumulation type fuel injection nozzle having an accumulation chamber for accumulating temporarily the fuel feed pressure from the fuel pressurization pump 22, which has an injection port formed in such a manner as to inject the fuel at a low pressure along the inner wall surface 21 of the swirl chamber 4. The subsidiary nozzle 2 comprises particularly an electrical injection nozzle whose needle valve is opened and closed electrically so that the fuel can be injected at a low pressure into the swirl chamber 4 from the second half of an intake stroke to a compression stroke when the needle valve is opened and closed upon receiving the instruction from a controller 20. For instance, it is possible to employ the structure wherein the needle valve assembled in the subsidiary nozzle 2 is moved vertically by a solenoid and opens the injection port of the subsidiary nozzle 2 when energized by the solenoid and the fuel can thus be injected into the swirl chamber 4. In other words, since the subsidiary nozzle 2 has the accumulation chamber, the fuel supplied from the fuel pressurization pump 22 is once accumulated in the subsidiary nozzle 2 and the accumulated fuel is injected when the needle valve is opened. Moreover, the quantity of the fuel due to the subsidiary injection from the subsidiary nozzles 2 may be such that it adheres to the inner wall surface 21 of the swirl chamber 4. For this reason, a low pressure type pump can be used sufficiently as the fuel pressurization pump 22 and its size and weight can be reduced drastically, thereby accomplishing the reduction of the cost.

In this heat-insulating engine with swirl chamber, the fuel injection pump 23 is equipped with a pump operation pulley 16 and the fuel pressurization pump 22, with a pump operation pulley 16 and the fuel pressurization pump 22, with a pump operation pulley 15. These pump operation pullies 15, 16 are connected to, and driven by, a crank pulley 18 which is fitted to a crank shaft 17 and rotates integrally with it, through a timing belt 19. Accordingly, the fuel injection pump 23 and the fuel pressurization pump 22 are driven by the timing belt 19 with the revolution of the engine.

In the heat-insulating engine with swirl chamber further, a fuel injection control apparatus for supplying the fuel to the swirl chambers 4 through the subsidiary nozzles 2 includes a sensor 24 for detecting the operating condition of the engine or in other words, an engine load, a sensor 25 for detecting the engine revolution, and a controller 20 for generating an instruction on receiving the detection signal from each sensor 24, 25. The engine load can be detected by detecting the fuel flow rate injected from the main fuel injection pump 23 and the engine revolution can be detected by detecting the number of revolutions of the crank shaft 17. The detection signals detected by these sensors 24, 25 are inputted to the controller 20. Receiving each detection signal, the controller 20 controls the open timing of the needle valve of the subsidiary nozzle 2 and controls the injection flow rate of the fuel supplied from the fuel pressurization pump 22 to the subsidiary nozzle 2. In other words, the fuel injection control apparatus in the heat-insulating engine with swirl chamber in accordance with the present invention controls the flow rate of the fuel injected from the subsidiary nozzles 2 into the swirl chambers 4 in response to the detection signals of the sensors 24, 25 for detecting the operating conditions of the engine such as the engine load and engine revolution, and controls also the injection timing for injecting subsidiarily the fuel from the subsidiary nozzles 2 into the swirl chambers 4 from the second half of the intake stroke to the compression stroke. In some cases, it is of course possible to employ the arrangement wherein the needle valve of the main nozzle 3 is opened and closed electrically and open/close timing of the main nozzle 3 and its opening are controlled by the instruction from the controller 20.

Figure 2:
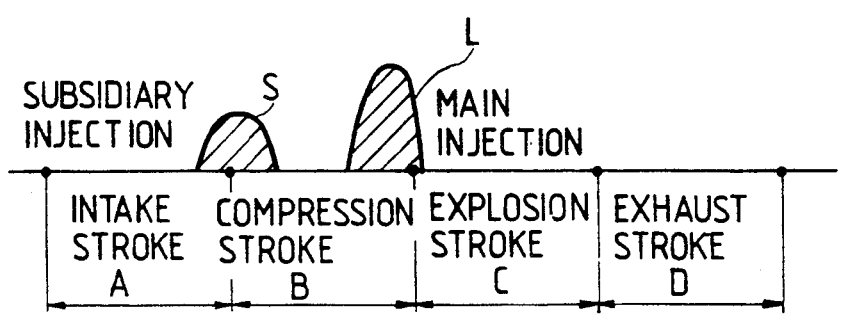
FIG. 2 is an explanatory view showing a fuel injection timing in the heat-insulating engine with swirl chamber shown in FIG. 1.

The heat-insulating engine with swirl chamber of this invention is driven in the operation strokes of the four cycles consisting of the intake stroke A, the compression stroke B, the expansion stroke C and the exhaust stroke D as shown in FIG. 2. In this heat-insulating engine with swirl chamber, the fuel injection control apparatus is particularly characterized in that a small quantity of the fuel is subsidiarily injected from the subsidiary nozzles 2 from the second half of the intake stroke A to the compression stroke B and then the fuel is mainly injected from the main nozzle 3 from the second half of the compression stroke B to the expansion stroke C. The flow rate S of the fuel injected from the subsidiary nozzles 2 into the swirl chambers 4 is from 0 to 30% of the total fuel injection quantity, for example, and the flow rate L of the fuel injected from the main nozzle 3 into the swirl chambers 4 is from 70 to 100% of the total fuel injection quantity, for example. Further, the fuel injection pattern 12 for injecting the fuel from the subsidiary nozzles 2 into the swirl chambers 4 is such that the fuel is injected along the inner wall surface 21 of each swirl chamber 2 under the contact state with the latter, and the heat energy is recovered from the inner wall surface 21 of the swirl chamber 4 by the injected fuel.

Next, another embodiment of the fuel injection control apparatus of the heat-insulating engine with swirl chamber in accordance with the present invention will be explained with reference to FIG. 3. In comparison with the structure of the embodiment described above, the structure of this embodiment is the same except that each of the fuel pressurization pump and the nozzle are available. Therefore, like reference numerals are used to identify the same components and the repetition of explanation will be omitted.

The fuel injection control apparatus of this heat-insulating engine with swirl chamber includes one nozzle 27 for supplying the fuel to the swirl chamber 4 and the fuel pressurization pump 28 for supplying the fuel to the nozzle 27. This nozzle 27 has the same structure as that of the subsidiary nozzle 2 described above and includes an accumulation chamber for accumulating temporarily the fuel feed pressure and a needle valve opened and closed electrically. The fuel injection control apparatus is also equipped with a sensor 24 for detecting an engine load as one of the operating conditions of the engine, a sensor 25 for detecting the engine revolution as another operating condition of the engine and a controller 20 for receiving the detection signals of these sensors 24, 25 and generating the instruction to the nozzle 27. The controller 20 controls the flow rate of the fuel injected from the nozzle 27 into the swirl chamber in response to the detection signals from the sensors 24, 25 and controls the opening and open timing of the nozzle 27 so that the fuel can be injected mainly into the swirl chambers 4 from the second half of the compression stroke to the expansion stroke and subsidiarily into the swirl chambers 4 from the second half of the intake stroke to the compression stroke. Accordingly, the fuel injection control apparatus of this heat-insulating and subsidiary injection into the swirl chambers by having only the nozzle 27 and the fuel pressurization pump 28.

What is claimed is:

1. A heat-insulating engine with swirl chamber which includes a cylinder block having cylinders, a cylinder head fitted to said cylinder block, pistons reciprocating inside said cylinders, swirl chamber blocks of a heat-insulating structure disposed in said cylinder head and swirl chambers formed in said swirl chamber blocks, and which is operated sequentially in four-stroke cycle of an intake stroke, a compression stroke, an expansion stroke and an exhaust stroke comprising:

subsidiary nozzles having injection ports thereof opened to said swirl chambers and injecting a subsidiary fuel amount along the wall surface of said swirl chamber blocks from the second half of said intake stroke to said compression stroke;

a fuel pressurization pump for supplying a low pressure fuel to said subsidiary nozzles;

main nozzles having injection ports thereof opened to said swirl chambers and injecting a main fuel amount into said swirl chambers from the second half of said compression stroke to the first half of said expansion stroke following the fuel injection by said subsidiary nozzles; and a fuel injection pump for supplying the fuel to said main nozzles.

2. A heat-insulating engine with swirl chamber according to claim 1, wherein a small quantity of the fuel among the total injection quantity is injected subsidiarily from said subsidiary nozzles along the wall surfaces of said swirl chambers and then the major proportion of the fuel among the total fuel injection quantity is injected from said main nozzles into said swirl chambers.

3. A heat-insulating engine with swirl chamber according to claim 1, wherein said swirl chamber blocks are made of ceramic material.

4. A heat-insulating engine with swirl chamber which includes a cylinder block having cylinders, a cylinder head fitted to said cylinder block, pistons reciprocating inside said cylinders, swirl chamber blocks of a heat-insulating structure disposed in said cylinder head and swirl chambers formed in said swirl chamber blocks, and which is operated sequentially in four-stroke cycle of an intake stroke, a compression stroke, an expansion stroke and an exhaust stroke comprising:

subsidiary nozzles having injection ports thereof opened to said swirl chambers, and subsidiary nozzles injecting fuel from the second half of said intake stroke to said compression stroke through said injection ports;

a fuel pressurization pump for supplying a low pressure fuel to said subsidiary nozzles;

main nozzles having injection ports thereof opened to said swirl chambers and injecting a main fuel amount from the second half of said compression stroke to the first half of said expansion stroke following the fuel injection by said subsidiary nozzles;

a fuel injection pump for supplying the fuel to said main nozzles;

sensors for detecting the operating conditions of the engine; and a controller controlling the flow rate of the fuel injected from said subsidiary nozzles in response to the detection signals from said sensors and controlling subsidiary injection of the fuel from the second half of said intake stroke to said compression stroke.

5. A heat-insulating engine with swirl chamber according to claim 4, wherein a small quantity of the fuel among the total fuel injection quantity is injected from said subsidiary nozzles along the wall surfaces of said swirl chambers and then the major proportion of the fuel from the total fuel injection quantity is injected from said main nozzles into said swirl chambers.

6. A heat-insulating engine with swirl chamber according to claim 4, wherein said swirl chamber block is made of a ceramic material.

7. A heat-insulating engine with swirl chamber which includes a cylinder block having cylinders, a cylinder head fitted to said cylinder block, pistons reciprocating inside said cylinders, a crank shaft for reciprocating said pistons inside said cylinders, swirl chamber blocks of a heat-insulating structure disposed in said cylinder head and swirl chambers formed in said swirl chamber blocks, and which is operated sequentially in four-stroke cycle of an intake stroke, a compression stroke, an expansion stroke and an exhaust stroke comprising:

subsidiary nozzle having injection ports thereof opened to said swirl chambers, said subsidiary nozzles injecting fuel along the inner wall surfaces of said swirl chamber blocks from the second half of said intake stroke to said compression stroke through injection ports;

a fuel pressurization pump for supplying a low pressure fuel to said subsidiary nozzles;

main nozzles having injection ports thereof opened to said swirl chambers and injecting a main fuel amount into said swirl chambers from the second half of said compression stroke to the first half of said expansion stork following said fuel injection by said subsidiary nozzles;

a fuel injection pump for supplying the fuel to said main nozzles; and rotary motion transmission means for transmitting the rotary motion of said crank shaft in order to operate said fuel injection pump and said fuel pressurization pump.

8. A heat-insulating engine with swirl chamber according to claim 7, wherein said rotary motion transmission means includes a crank pulley fitted to said crank shaft, a pump operation pulley for operating said fuel injection pump, a pump operation pulley for operating said fuel pressurization pump and a timing belt for transmitting the rotary motion of said crank pulley to each of said pump operation pullies.

9. A heat-insulating engine with swirl chamber which includes a cylinder block having cylinders, a cylinder head fitted to said cylinder block, pistons reciprocating inside said cylinders, swirl chamber blocks of a heat-insulating structure disposed in said cylinder head and swirl chambers formed in said swirl chamber blocks, and which is operated sequentially in four-stroke cycle of an intake stroke, a compression stroke, an expansion stroke and an exhaust stroke comprising:

nozzles having injection ports thereof opened to said swirl chambers and injecting fuel to said swirl chambers through said injection ports;

a fuel pressurization pump for supplying the fuel to said nozzles;

sensors for detecting the operating conditions of the engine; and a controller for controlling the flow rate of the fuel injected from said nozzles in response to the detection signals of said sensors, injecting a subsidiary fuel amount along the inner wall surfaces of said swirl chamber through said injection ports from the second half of said intake stroke to said compression stroke, and then injecting a main fuel amount through said injection ports from the second half of said compression stroke to said expansion stroke.

10. A heat-insulating engine with swirl chamber according to claim 9, wherein a small quantity is injected from said subsidiary nozzles along the wall surfaces of said swirl chambers and the major proportion of the fuel from the total fuel injection quantity is injected into said swirl chambers from said main nozzles.

11. A heat-insulating engine with swirl chamber according to claim 9, wherein said swirl chamber block is made of a ceramic material.

12. A heat-insulating engine with swirl chamber which includes a cylinder block having cylinders, a cylinder head fitted to said cylinder block, pistons reciprocating inside said cylinders, a crank shaft for reciprocating said pistons inside said cylinders, swirl chamber blocks of a heat-insulating structure disposed in said cylinder head and swirl chambers formed in said swirl chamber blocks, and which is operated sequentially in four-stroke cycle of an intake stroke, a compression stroke, an expansion stroke and an exhaust stroke comprising:

nozzles having injection ports thereof opened to said swirl chambers and injecting fuel to said swirl chambers through said injection ports;

a fuel pressurization pump for supplying the fuel to said nozzles;

sensors for detecting the operating conditions of the engine;

a controller for controlling the flow rate of the fuel injected from said nozzles in response to the detection signals of said sensors, injecting a subsidiary fuel amount along the inner wall surfaces of said swirl chambers through said injection ports from the second half of said intake stroke to said compression stroke and then injecting a main fuel amount through said injection ports from the second half of said compression stroke to said expansion stroke; and rotary motion transmission means for transmitting the rotary motion of said crank shaft in order to operate said fuel pressurization pump.

13. A heat-insulating engine with swirl chamber according to claim 12, wherein said rotary motion transmission means includes a crank pulley fitted to said crank shaft, a pump operation pulley for operating said fuel pressurization pump and a timing belt for transmitting the rotary motion of said crank pulley to said pump operation pulley.

* * * * *